US012676716B2

(12) United States Patent
Rupasinghe et al.

(10) Patent No.: US 12,676,716 B2
(45) Date of Patent: Jul. 7, 2026

(54) METHOD OF SRS-ASSISTED SUB-BAND CONFIGURATION FOR TYPE I/II CHANNEL STATE INFORMATION (CSI)

(71) Applicants: NTT DOCOMO, INC., Tokyo (JP); DOCOMO INNOVATIONS INC., Palo Alto, CA (US)

(72) Inventors: Nadisanka Rupasinghe, Tokyo (JP); Haralabos Papadopoulos, Tokyo (JP); Yuki Matsumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 932 days.

(21) Appl. No.: 17/800,860

(22) PCT Filed: Feb. 19, 2021

(86) PCT No.: PCT/US2021/018711
§ 371 (c)(1),
(2) Date: Aug. 18, 2022

(87) PCT Pub. No.: WO2021/168198
PCT Pub. Date: Aug. 26, 2021

(65) Prior Publication Data
US 2023/0090267 A1      Mar. 23, 2023

Related U.S. Application Data

(60) Provisional application No. 62/979,134, filed on Feb. 20, 2020.

(51) Int. Cl.
H04L 5/00          (2006.01)
H04L 25/02         (2006.01)

(52) U.S. Cl.
CPC .......... H04L 5/0051 (2013.01); H04L 5/0094 (2013.01); H04L 25/0224 (2013.01)

(58) Field of Classification Search
CPC . H04L 5/0051; H04L 5/0094; H04L 25/0224; H04L 5/0048; H04L 5/0023
See application file for complete search history.

(56) References Cited

U.S. PATENT DOCUMENTS

| | | | |
|---|---|---|---|
| 2017/0026953 A1* | 1/2017 | Wang | H04B 7/066 |
| 2018/0167116 A1* | 6/2018 | Rahman | H04B 7/0639 |
| 2019/0260448 A1 | 8/2019 | Rahman et al. | |

FOREIGN PATENT DOCUMENTS

| | | |
|---|---|---|
| JP | WO2017086011 A1 | 9/2018 |
| WO | 2019029675 A1 | 2/2019 |
| WO | 2019136934 A1 | 7/2019 |

OTHER PUBLICATIONS

Office Action issued in the counterpart Japanese Application No. 2022-549797, mailed Sep. 12, 2023 (9 pages).
(Continued)

*Primary Examiner* — Khoa Huynh
(74) *Attorney, Agent, or Firm* — Osha Bergman Watanabe & Burton LLP

(57) ABSTRACT

A wireless communication method is disclosed for a user equipment (UE) in communication with a base station (BS) in a network (NW) that includes receiving from the BS, via higher-layer signaling or downlink control information (DCI), configuration information and configuring reception of one or more Channel State Information-Reference Signals (CSI-RSs) based on the configuration information, where the configuration information includes one or more new values to configurable CSI-RS ports in Type II port-selection codebook.

6 Claims, 17 Drawing Sheets

| $x$ | SB size |
|---|---|
| 0 | 12 |
| 1 | 16 |

(56) References Cited

OTHER PUBLICATIONS

Huawei, HiSilicon: "Considerations on two-level configuration of CSI acquisition settings", 3GPP TSG RAN WG1 Meeting #88, R1-1701682; Athens, Greece, Feb. 13-17, 2017 (5 pages).
Huawei, HiSilicon: "Remaining issues for CSI framework", 3GPP TSG RAN WG1 Meeting #91 R1-1719426; Reno, USA, Nov. 27-Dec. 1, 2017 (8 pages).
ZTE: "Other enhancements for Rel-16 URLLC", 3GPP TSG RAN WG1 #98 R1-1908241; Prague, CZ, Aug. 26-30, 2019 (13 pages).
International Search Report issued in PCT/US2021/018711 on Jul. 21, 2021 (7 pages).
Written Opinion of the International Searching Authority issued in PCT/US2021/018711 on Jul. 21, 2021 (9 pages).
ZTE; "Maintenance of CSI enhancement for MU-MIMO support"; 3GPP TSG RAN WG1 Meeting #100-e, R1-2000238; e-Meeting; Feb. 24-Mar. 6, 2020 (2 pages).
NTT Docomo; "Type II CSI Enhancement for MU-MIMO Support"; 3GPP TSG RAN WG1 Meeting #98bis, R1-1911183; Chongqing, China; Oct. 14-18, 2019 (9 pages).

* cited by examiner

**Example: Different Precoders
are Generated for $N_3$ SBs**

FIG. 2

| Bandwidth part (PRBs) | Subband size (PRBs) |
| --- | --- |
| < 24 | N/A |
| 24 – 72 | 4, 8 |
| 73 – 144 | 8, 16 |
| 145 – 275 | 16, 32 |

PDP of the Original Channel
$\tau_{b_i}^l$ : Delay Spread of *i*-th Beam
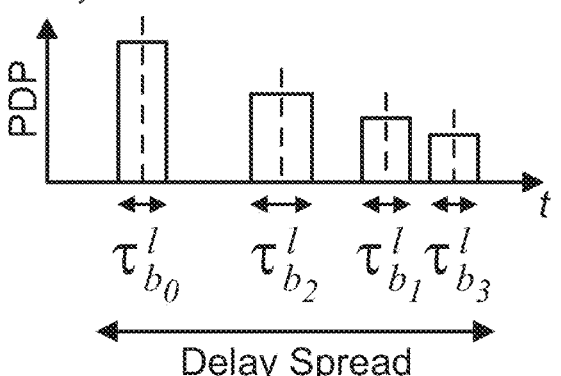
**Frequency Response
of the Channel**
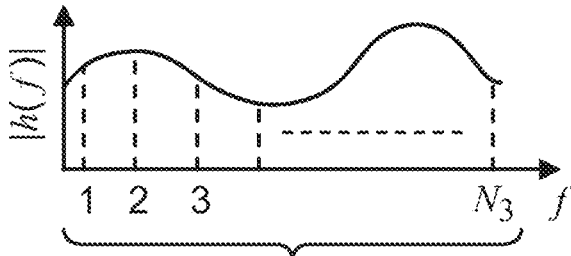
*FIG. 6*

PDP of the Original Channel
$\tau_{b_i}^l$ : Delay Spread of *i*-th Beam
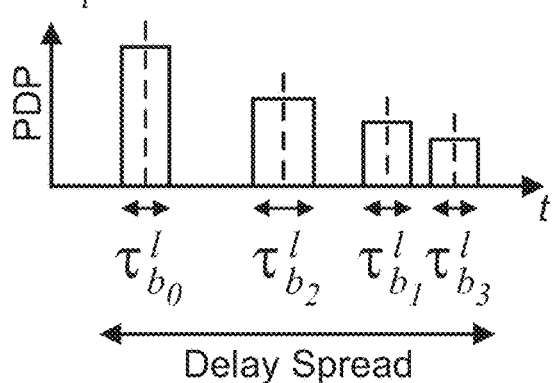
**PDP of the Delay
Pre-compensated Channel**
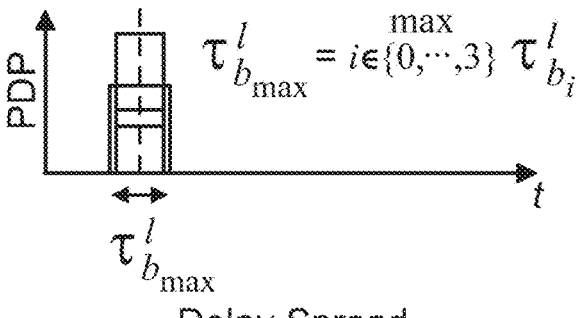
Frequency Response
- - - Original
——— Delay Pre-compensated
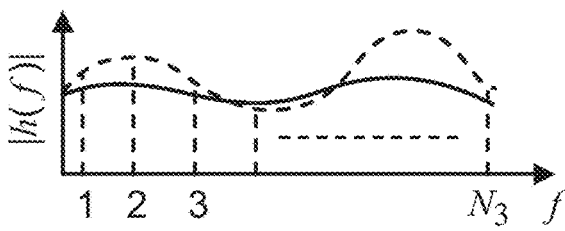
*FIG. 7*

FIG. 8

| Bandwidth part (PRBs) | Subband size (PRBs) |
|---|---|
| < 24 | N/A |
| 24 – 72 | 4, 8 |
| 73 – 144 | 8, 16 |
| 145 – 275 | 16, 32 |

```
reportFreqConfiguration    SEQUENCE {
cqi-FormatIndicator        ENUMERATED { widebandCQI,  subbandCQI },
pmi-FormatIndicator        ENUMERATED { widebandPMI,  subbandPMI },
csi-ReportingBand          CHOICE {
    subbands3              BIT STRING(SIZE(3)),
    subbands4              BIT STRING(SIZE(4)),
    subbands5              BIT STRING(SIZE(5)),
    subbands6              BIT STRING(SIZE(6)),
    subbands7              BIT STRING(SIZE(7)),
    subbands8              BIT STRING(SIZE(8)),
    subbands9              BIT STRING(SIZE(9)),
    subbands10             BIT STRING(SIZE(10)),
    subbands11             BIT STRING(SIZE(11)),
    subbands12             BIT STRING(SIZE(12)),
    subbands13             BIT STRING(SIZE(13)),
    subbands14             BIT STRING(SIZE(14)),
    subbands15             BIT STRING(SIZE(15)),
    subbands16             BIT STRING(SIZE(16)),
    subbands17             BIT STRING(SIZE(17)), subbands18             BIT STRING(SIZE(18)),
    ...,
    subbands19-v1530       BIT STRING(SIZE(19)),
}   OPTIONAL  -- Need S
}
```

SB Selection for CSI Reporting reportFreqConfiguration from CSI-ReportconfigIE

| Bandwidth part (PRBs) | Subband size (PRBs) |
|---|---|
| <24 | *4, 8, 12* |
| 24-72 | 4, 8, *12, 16* |
| 73-144 | 8, 16, *12, 24* |
| 145-275 | 16, 32, *36, 44* |

*Italic entries* are newly added to the Table 5.2.1.4.2 of 3GPP TS 38.214 as some example values for possible SB sizes

FIG. 11

| $x$ | SB size |
|-----|---------|
| 0 | 12 |
| 1 | 16 |

FIG. 12

| Bandwidth part (PRBs) | Subband size (PRBs) |
|---|---|
| <24 | *4, 8, 12* |
| 24-72 | 4, 8, *12, 16* |
| 73-144 | 8, 16, *12, 24* |
| 145-275 | 16, 32, *36, 44* |

*Italic entries* are newly added to the Table 5.2.1.4.2 of 3GPP TS 38.214 as some example values for possible SB sizes

FIG. 13

| $x$ | SB size |
|-----|---------|
| 0 | 12 |
| 1 | 16 |

FIG. 15 subband8 { [11111111] ⇦ Report CSI for all SBs
           [10001000] ⇦ Report CSI once every 4 SBs

METHOD OF SRS-ASSISTED SUB-BAND CONFIGURATION FOR TYPE I/II CHANNEL STATE INFORMATION (CSI)

TECHNICAL FIELD

One or more embodiments disclosed herein relate to a method of sounding reference signal (SRS)-assisted sub-band configuration for Type I/II channel state information (CSI) in a wireless communication system.

BACKGROUND ART

In 5G new radio (NR) technologies, precoder generation is performed per sub-band (SB) for DL beamforming as shown in FIG. 1. SB sizes are higher layer configured as shown in FIG. 2.

A fixed configuration of the SB size may not be efficient in terms of the channel state information (CSI) feedback overhead. In particular, in a wireless propagation medium which under goes regular fluctuations, it may be required to have some flexibility in configuring SB sizes.

With sounding reference signals (SRS) based uplink (UL)/downlink (DL) partial reciprocity, channel condition may be determined to a certain extend at a network (NW) side.

Further, considering estimated/determined channel condition, a NW can introduce some pre-compensations, i.e., pre-compensation for the delays of multi-path channel, such that UE can observe slow variations in the channel.

This necessitates, dynamic configuration of SB size or CSI reporting SBs such that additional knowledge gathered from SRS partial reciprocity may be effective utilized for lowering CSI feedback overhead.

Next, we discuss how delay pre-compensation may be introduced utilizing UL/DL reciprocity of SRS and possible ways to dynamically configure SB sizes/CSI reporting SBs in order to reduce feedback overhead Type II CSI in NR Rel. 15 will be explained below. FIG. 3 shows an example where L=2 2D-DFT vectors $b_i$ and $b_j$ are linearly combined to better represent user channel, h.

In Type II CSI in NR Rel. 15, SB wise precoding vector generation for layer k being a subset of $\{1,2\}$ ($l \in \{1,2\}$) may be given as:

$$W_k(N_t \times N_3) = W_1 W_{2,k}$$

In the above equation, $N_t$ represents the number of ports and $N_3$ represents the number of sub-bands.

$W_1(N_t \times 2L)$ is consists of $L \in \{2,4\}$ spatial domain (SD) 2D-DFT basis vectors. In an example of FIG. 3, $W_1(N_t \times 2L)$ may be consist of vectors $b_i$ and $b_1$.

$W_{2,k}(2L \times N_3)$ indicates SB complex linear combination (LC) coefficient matrix for layer k. In an example of FIG. 3, SB complex LC coefficients may be $c_i$ and $c_j$.

Type II CSI in NR Rel. 15 framework may be used for multi-user (MU)-MIMO. A user channel is represented by linearly combining L beams (corresponding to L 2D-DFT vectors). In Type II CSI in NR Rel. 15, Rank=1, 2 is supported.

Type II CSI in NR Rel. 16 will be explained below.

High correlation of LC coefficients allow to apply FD compression to $W_{2,k}$. Accordingly, SB-wise precoding vector generation for layer $l \in \{1, 2, 3, 4\}$ in Rel. 16 may be given as:

$$W_k(N_t \times N_3) = W_1 \tilde{W}_k W_{f,k}^H$$

In this equation, $$\tilde{W}_k W_{f,k}^H \approx W_{2,k}.$$

In this equation, $W_{f,k}$ ($N_3 \times M$) represents a matrix consisting of M DFT vectors for layer l. $\tilde{W}_k$ ($2L \times M$) represents a matrix consisting of LC coefficients for layer k.

With FD compression, the rows of $W_{2,k}$ are represented as linear combinations of $M \ll N_3$, DFT basis vectors each of size ($N_3 \times 1$).

Type II port selection codebook (CB) will be described below. Type II port selection CB does not require the UE to derive SD beams considering 2D-DFT basis as in regular Type II CB. Instead, the BS transmits beamformed CSI-RS and the UE has to identify best CSI-RS ports (beams) and report their indices within $W_1$.

SB wise precoding vector generation for layer $k \in \{1, 2, 3, 4\}$ may be given as:

$$W_k(N_t \times N_3) = W_1 W_{2,k}$$

$W_1$ is consists of col. vectors of an identity matrix. The vectors correspond to selected beams.

The number of CSI-RS ports are higher layer configured. For example, $P_{CSI-RS} \in \{4, 8, 12, 16, 24, 32\}$.

The selected column vectors in $W_1$ correspond to selected port.

The number of ports (beams) are to be selected. For example, $L \in \{2,3,4\}$ when $P_{CSI-RS} > 4$.

CITATION LIST

Non-Patent Reference

[Non-Patent Reference 1] 3GPP TS 38.214, "NR; Physical layer procedures for data (Release 15)"

SUMMARY OF INVENTION

One or more embodiments of the present invention provide a wireless communication method for a user equipment (UE) in communication with a base station (BS) in a network (NW), the method including receiving from the BS, via higher-layer signaling or downlink control information (DCI), configuration information and configuring reception of one or more Channel State Information—Reference Signals (CSI-RSs) based on the configuration information, where the configuration information includes one or more new values to configurable CSI-RS ports in Type II port-selection codebook.

One or more embodiments of the present invention provide a wireless communication method for a user equipment (UE) in communication with a base station (BS) including receiving from the BS, via higher-layer signaling or downlink control information (DCI), configuration information and configuring a layer-specific/layer-common dynamic subband (SB) size configuration using the configuration information.

One or more embodiments of the present invention provide a user equipment (UE) in communication with a base station (BS) including a receiver that receives from the BS, via higher-layer signaling or downlink control information (DCI), configuration information and a processor that configures reception of one or more Channel State Information—Reference Signals (CSI-RSs) based on the configuration information, where the configuration information includes one or more new values to configurable CSI-RS ports in Type II port-selection codebook.

One or more embodiments of the present invention provide a user equipment (UE) in communication with a base station (BS) including a receiver that receives from the BS, via higher-layer signaling or downlink control information (DCI), configuration information and a processor that configures a layer-specific/layer-common dynamic subband (SB) size configuration using the configuration information. Other embodiments and advantages of the present invention will be recognized from the description and figures.

Other embodiments and advantages of the present invention will be recognized from the description and figures.

BRIEF DESCRIPTION OF THE DRAWINGS

FIG. 2 shows an example of SB sizes for different bandwidth parts.

FIG. 6 shows an example of Power delay profile (PDP) for the channel in FIG. 5.

FIG. 7 shows an example of delay pre-compensation for l-th layer according to one or more embodiments.

FIG. 8 shows a table indicating subband sizes for a bandwidth part.

FIG. 9 shows CSI-ReportConfig indicating frequency granularity.

FIG. 10 shows a table indicating subband sizes for a bandwidth part according to one more embodiments.

FIG. 11 shows a table indicating SB sizes corresponding to one bit in the DCI according to one more embodiments.

FIG. 12 shows a table indicating subband sizes for a bandwidth part according to one more embodiments.

FIG. 13 shows a table indicating SB sizes corresponding to one bit in the DCI according to one more embodiments.

FIG. 15 shows CSI reporting SB sequences where the number of SBs is 8 according to one more embodiments.

DESCRIPTION OF EMBODIMENTS

Figure 1:
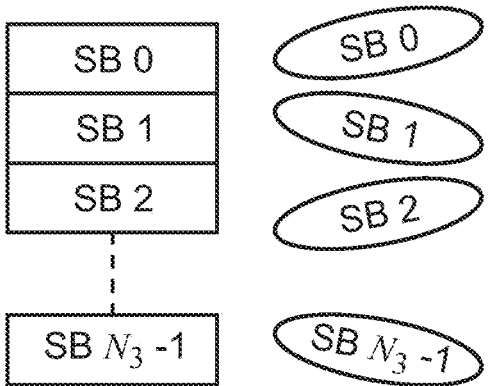
FIG. 1 shows an example where different precoders are generated for $N_3$ SBs.
Figure 3:
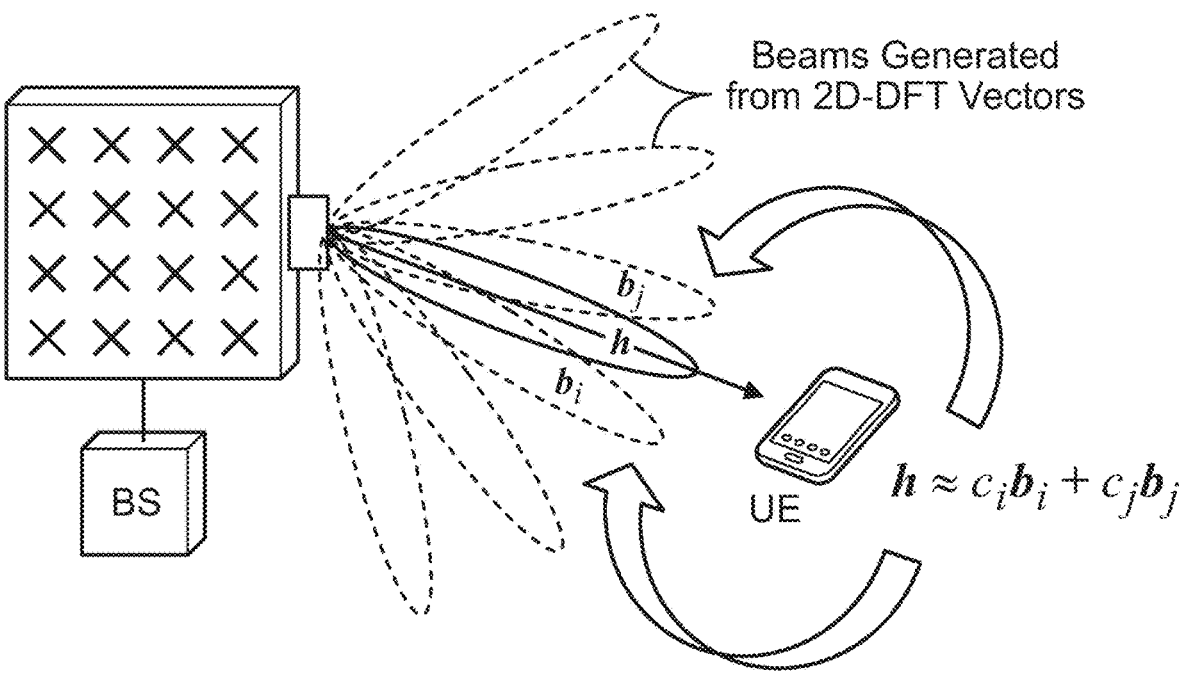
FIG. 3 shows SD Beam-wise frequency response of L=4 2D-DFT beams.

Embodiments of the present invention will be described in detail below with reference to the drawings. Like elements in the various figures are denoted by like reference numerals for consistency.

In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 4:
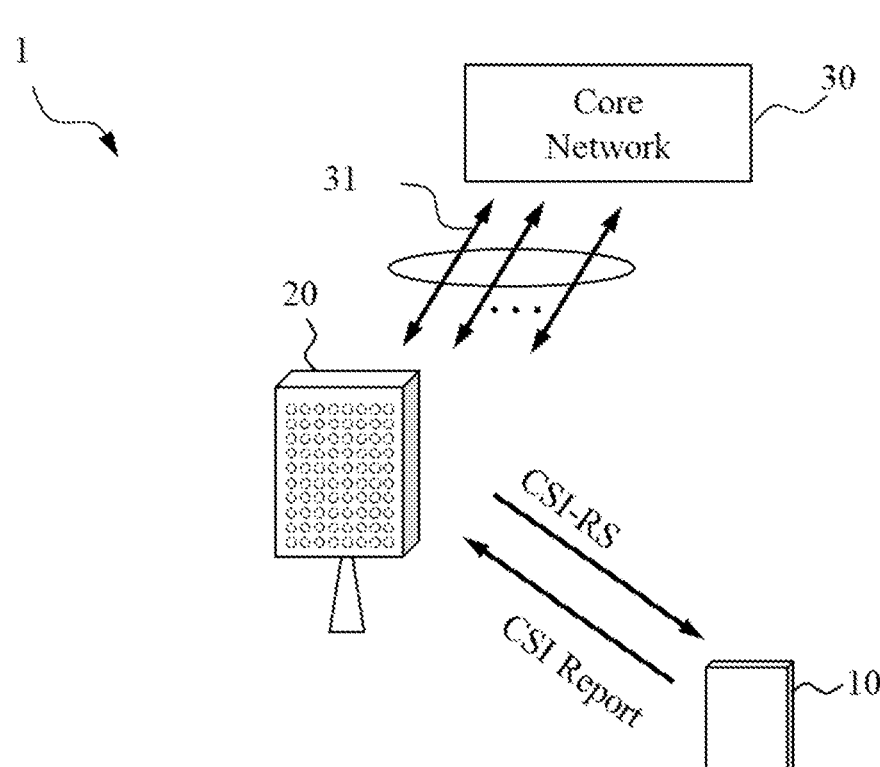
FIG. 4 shows a configuration of a wireless communication system according to one or more embodiments.

FIG. 4 is a wireless communications system 1 according to one or more embodiments of the present invention. The wireless communication system 1 includes a user equipment (UE) 10, a base station (BS) 20, and a core network 30. The wireless communication system 1 may be a NR system. The wireless communication system 1 is not limited to the specific configurations described herein and may be any type of wireless communication system such as an LTE/LTE-Advanced (LTE-A) system.

The BS 20 may communicate uplink (UL) and downlink (DL) signals with the UE 10 in a cell of the BS 20. The DL and UL signals may include control information and user data. The BS 20 may communicate DL and UL signals with the core network 30 through backhaul links 31. The BS 20 may be gNodeB (gNB). The BS 20 may be referred to as a network (NW) 20.

The BS 20 includes antennas, a communication interface to communicate with an adjacent BS 20 (for example, X2 interface), a communication interface to communicate with the core network 30 (for example, S1 interface), and a CPU (Central Processing Unit) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the wireless communication system 1.

The UE 10 may communicate DL and UL signals that include control information and user data with the BS 20 using Multi Input Multi Output (MIMO) technology. The UE 10 may be a mobile station, a smartphone, a cellular phone, a tablet, a mobile router, or information processing apparatus having a radio communication function such as a wearable device. The wireless communication system 1 may include one or more UEs 10.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

As shown in FIG. 4, the BS 20 may transmit a CSI-Reference Signal (CSI-RS) to the UE 10. In response, the UE 10 may transmit a CSI report to the BS 20.

(Analyzing Channel Frequency Response)

How to analyze a channel frequency response will be described below.

Figure 5:
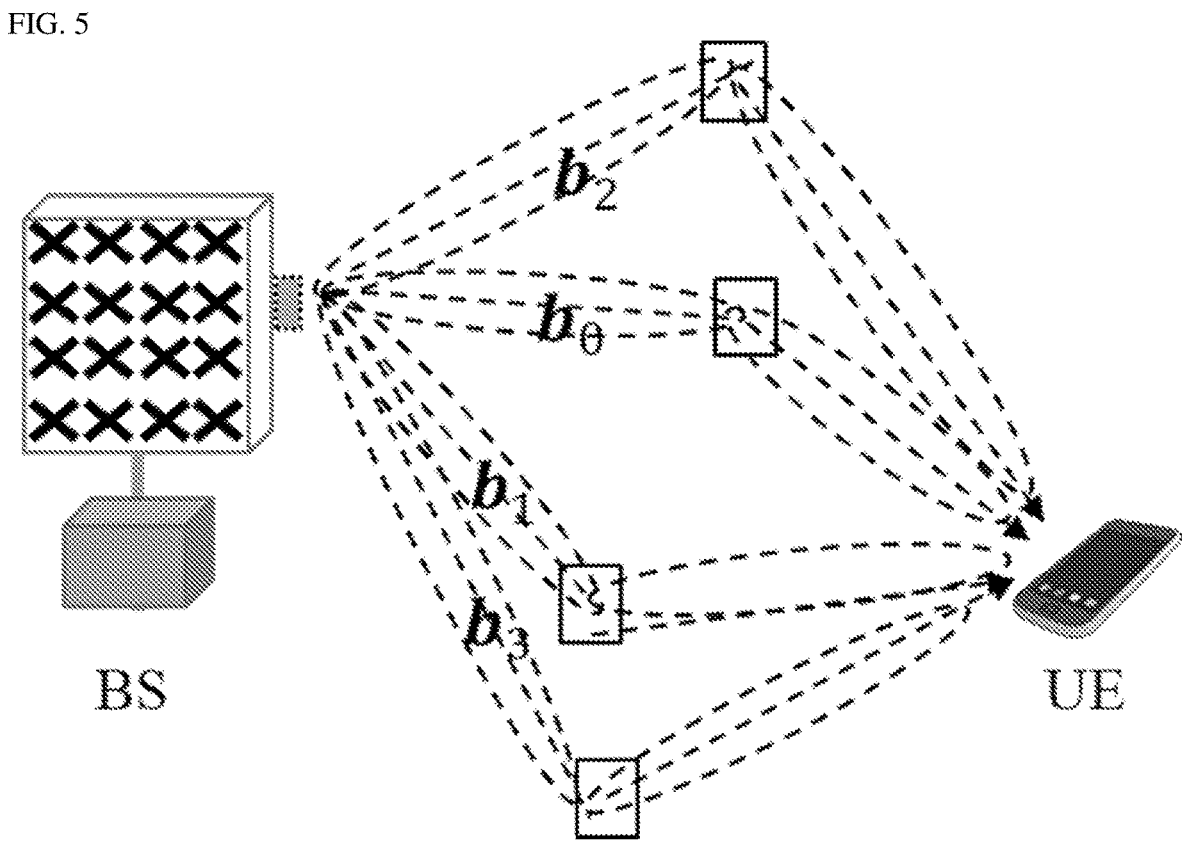
FIG. 5 shows an example of L=4 with each SD beam associated with a single cluster.

Linearly combined SD beams/ports represent l-th dominant Eigen vector of WB channel covariance matrix for l-th layer transmission. FIG. 5 shows an example of L=4 with each SD beam associated with a single cluster. FIG. 6 shows an example of power delay profile (PDP) for the channel in FIG. 5. Considering DL/UL reciprocity of SRS, mean delay(s) and associated spreads of each SD beam may be estimated at the BS for each layer.

(SRS-Assisted Delay Pre-Compensation)

In one or more embodiments, estimated mean delay(s) and associated spread(s) of each SD beam utilizing SRS may then be used for delay pre-compensation at the BS 20. FIG.

7 shows an example of delay pre-compensation for l-th layer. As shown in FIG. 7, after delay pre-compensation, the frequency response of the channel is almost flat. Channel coherence BW is much larger than Rel. 15/16 precoding matrix indicator (PMI) SB size. The SB sizes in Rel. 15/16 may be further increased due to almost flat frequency response. Note that, with delay pre-compensation for each SD beam, wide band reporting may be sufficient. To improve performance further, UE may report DFT bases associated with one or two additional delays within the delay spread of that particular SD beam.

(Overview of PMI SB Sizes from Rel. 15/16)

The UE 10 may be configured via higher layer signaling with one out of two possible SB sizes as shown in a table of FIG. 8.

However, for which SBs, the CSI to be reported within the CSI report may be higher layer configured. In particular, CSI-ReportConfig indicates the frequency granularity of the CSI report as shown in FIG. 9.

(Layer-Specific SB Size Configuration)

For l-th layer where $l \in \{1, 2, 3, 4\}$, the delay spread after delay pre-compensation may be given as, $$\tau^l_{b_{max}} = \max_{i \in \{0, \cdots, L-1\}} \tau^l_{b_i} \qquad (1)$$

Based on Equation (1), the coherence BW, $\tilde{B}_l$ of delay pre-compensated channel for l-th layer may be approximately given as, $$\tilde{B}_l \approx \frac{1}{\tau^l_{b_{max}}} \qquad (2)$$

In Example 1-1, the SB size may be identified based on Equation (2) for l-th layer at the BS 20 and then using x-bit(s) in downlink control information (DCI) or higher layer signaling, the UE 10 may be configured with the identified SB size for CSI reporting or wide band reporting In Example 1-1.1, the SB size is determined based on Equation (2) and is explicitly configured.

If $\tilde{B}_l = 150$ kHz, this is explicitly configured using DCI or higher layer signaling.

As another example, if $\tilde{B}_l = 150$ kHz, this may be configured based on number of sub-carriers (SCs), i.e., for 15 kHz numerology, 10 SCs represent $\tilde{B}_l = 150$ kHz.

In Example 1-1.2, as captured in Table 5.2.1.4.2 of 3GPP TS 38.214, a set of configurable SB sizes may be defined in FIG. 10 for different bandwidth parts. Further, as per Rel. 16 of the TS 38.214 specification, the parameter R can be configured appropriately, e.g., R=4, 2, 0.5, 0.25 etc., to select a specific PMI sub-band size based on the configured CQI sub-band size.

In Example 1-1.2.1, the SB size for l-th layer may be identified from the table in FIG. 10 (the closest SB size to the derived value from Equation (2)) and configure that value explicitly or implicitly using DCI. For example, using x=2 bits in the DCI, based on the SRS partial reciprocity, one out of three or four SB sizes (for a given bandwidth part) from the table in FIG. 10 may be explicitly configured dynamically.

In Example 1-1.2.2, using higher layer signaling, multiple values for the SB size may be configured considering a table as captured above. The SB size for l-th layer can then be identified from those configured values (the closest SB size to the derived value from Equation (2)) and configure that value using x-bit(s) in the DCI. For example, as shown in FIG. 11, if the SB sizes 12 or 16 are higher layer configured, using x=1 bits in the DCI, based on the SRS based UL/DL partial reciprocity, one out of the two SB sizes (for a given bandwidth part) may be selected dynamically.

Both bandwidth part and SB size are radio resource control (RRC) configured in Rel. 15/16. On the other hand, in one or more embodiments, Example 1-1.2.1 and Example 1-1.2.2, only bandwidth part is RRC configured while the SB size is configured by the DCI.

Based on a location of the detected DCI in the UE 10, i.e., CCE index, RB etc. it is also possible for the UE 10 to implicitly determine information captured explicitly using x-bit(s) in the DCI for Example 1-1.2.1 and Example 1-1.2.2

In Example 1-1.3, new states may be added to CSI-AperiodicTriggerStateList capturing different SB sizes. Then using CSI request field in the DCI, new state which is closest to the SB size derived from Equation (2) may be selected for l-th layer.

In Example 1-1.3.1, without adding additional bits to CSI request field of size NTs-bits in the DCI, new state selection may be handled. In such a case, if configured states are greater than $2^{N_{TS}}-1$, the UE 10 is separately configured with a selection command to map $2^{N_{TS}}-1$ code points to trigger states.

In Example 1-1.3.2, additional x-bit(s) may be added to CSI request field size NTS-bits in the DCI, in order to select newly added states to the CSI-AperiodicTriggerStateList.

The above Example 1-1, Example 1-1.1, Example 1-1.2, Example 1-1.2.1, Example 1-1.2.2, and Example 1-1.3 are discussed for delay pre-compensated channel. However, the above options for the SB configuration are valid even without applying delay pre-compensation. For example, by analyzing delay spread of the channel considering SRS in the UL (no delay pre-compensation), the NW (BS) 20 can configure appropriate SB size considering the above options.

In Example 1-2, by analyzing channel conditions considering SRS transmission, the NW 20 can configure different SB sizes for l-th layer more flexibly and dynamically using Example 1-1. Example 1-1.1, Example 1-1.2, Example 1-1.2.1, and Example 1-1.2.2.

(Layer-Common SB Size Configuration)

As mentioned above for l-th layer where $l \in \{1, 2, 3, 4\}$, delay pre-compensation may be applied for all layers in a given rank.

The delay spread, $\tau_{b_{max}}$ after delay pre-compensation of all layers may be given as, $$\tau_{b_{max}} = \max_{l \in \{0, \cdots, RI-1\}} \tau^l_{b_{max}} \qquad (3)$$

Based on Equation (3), the coherence BW, $\tilde{B}$ of delay pre-compensated channels of all layers may be approximately given as, $$\tilde{B} \approx \frac{1}{\tau_{b_{max}}} \qquad (4)$$

In Example 2-1, the SB size may be identified based on Equation (4) common for all layers at the BS 20 and then using x-bit(s) in the DCI or higher layer signaling, the UE 10 may be configured with the identified SB size.

In Example 2-1, the SB size may be identified based on Equation (4) common for all layers at the BS 20 and then using x-bit(s) in the DCI or higher layer signaling, the UE 10 may be configured with the identified SB size.

In Example 2-1.1: SB size is determined based on Equation (4) and is explicitly configured.

If B̃=150 kHz, then, this is explicitly configured using the DCI or higher layer signaling.

As another example, if B̃=150 kHz, this may be configured based on number of sub-carriers, i.e., for 15 kHz numerology, 10 SCs represent B̃=150 kHz.

In Example 2-1.2, as captured in Table 5.2.1.4.2 of 3GPP TS 38.214, a set of configurable SB sizes may be defined in FIG. 12 for different bandwidth parts. Further, as per Rel. 16 of the TS 38.214 specification, the parameter R can be configured appropriately, e.g., R=4, 2, 0.5, 0.25 etc., to select a specific PMI sub-band size based on the configured CQI sub-band size In Example 2-1.2.1, the SB size common for all layers may be identified from the table above (the closest SB size to the derived value from Equation (4)) and configure that value explicitly or implicitly using the DCI.

For example, using x=2 bits in the DCI, based on SRS partial reciprocity, one out of three or four SB sizes (for a given bandwidth part) from above table may be explicitly configured dynamically.

In Example 2-1.2.2, using higher layer signaling, multiple values for SB size may be configured considering a table as captured above. The SB size common for all layers can then be identified from those configured values (the closest SB size to the derived value from Equation (4)) and configure that value using x-bit(s) in the DCI.

If the SB sizes 12 or 16 are higher layer configured, using x=1 bits in the DCI as shown in FIG. 13, based on SRS based UL/DL partial reciprocity, one out of those two SB sizes (for a given bandwidth part) may be selected dynamically.

Both bandwidth part and SB size are RRC configured in Rel. 15/16. On the other hand, in one or more embodiments, Example 2-1.2.1 and Example 2-1.2.2, only bandwidth part is RRC configured while the SB size is configured by the DCI.

Based on a location of the detected DCI, i.e., CCE index, RB etc. it is also possible for the UE to implicitly determine information captured explicitly using x-bit(s) in the DCI for Example 2-1.2.1 and Example 2-1.2.2.

In Example 2-1.3, new states may be added to CSI-AperiodicTriggerStateList capturing multiple SB sizes. Then using CSI request field in the DCI format 0_1 for A-CSI triggering, new state which is closest to the SB size derived from Equation (4) may be selected common for all layers.

In Example 2-1.3.1, without adding additional bits to CSI request field of size NTs-bits in the DCI, new state selection may be handled. In such a case, if configured states are greater than $2^{N_{TS}}-1$, the UE is separately configured with a selection command to map $2^{N_{TS}}-1$ code points to trigger states.

In Example 2-1.3.2, additional x-bit(s) may be added to CSI request field size NTs-bits in the DCI, in order to select newly added states to the CSI-AperiodicTriggerStateList.

The above Example 2-1, Example 2-1.1, Example 2-1.2, Example 2-1.2.1, Example 2-1.2.2, Example 2-1.3 are discussed for delay pre-compensated channel. However, those proposals for SB configuration are valid even without applying delay pre-compensation. For example, by analyzing channel condition considering SRS in the UL (no delay pre-compensation), the NW (BS) 20 can configure appropriate SB size considering the above options.

In Example 2-2, by analyzing channel conditions considering SRS transmission, the NW can configure different SB sizes common for all layers more flexibly and dynamically using Example 2-1. Example 2-1.1, Example 2-1.2, Example 2-1.2.1, and Example 2-1.2.2.

(CSI Reporting SB Configuration)

Figure 14:
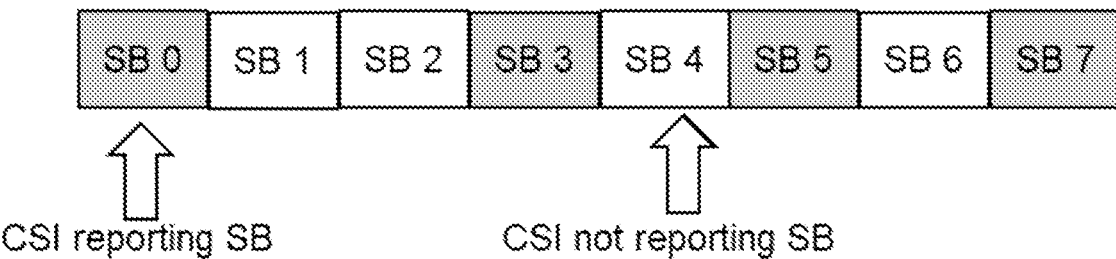
FIG. 14 shows an example where CSI reporting SB configuration for 8 SBs based on RRC parameter csi-ReportingBand according to one or more embodiments.

A CSI reporting SB configuration may be modified with/without PMI SB size modification, to cater for updated coherence BW due to delay pre-compensation. For example, as shown in FIG. 14, the CSI reporting SB configuration for 8 SBs based on RRC parameter csi-ReportingBand. For a given number of SBs, if multiple CSI reporting configurations may be defined, the NW 20 has the flexibility to select most appropriate configuration analyzing channel condition based on SRS partial reciprocity.

According to one or more embodiments, in Example 3-1, new states may be added to CSI-AperiodicTriggerStateList in order to capture multiple CSI reporting SB configurations. Then using CSI request field in the DCI format 0_1 for A-CSI triggering, new state which is closest to the required CSI reporting frequency granularity may be selected for l-th layer/common for all layers.

Figure 15:
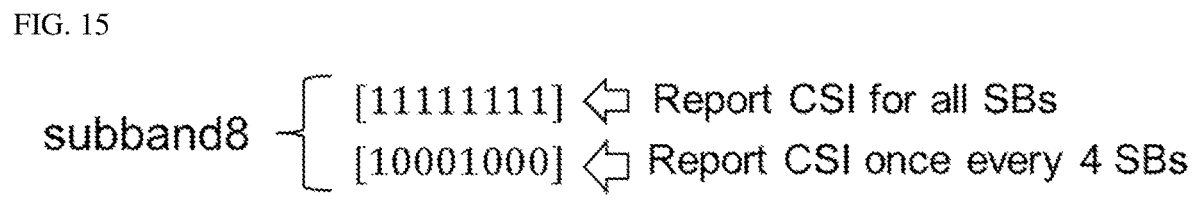

Example 3-1.1: Additional csi-ReportingBand for a given number of SBs may be introduced and new CSI-ReportConfig may be defined capturing those new csi-ReportingBand. For example, if the number of SBs are 8, following two CSI reporting SB sequences may be defined in FIG. 15.

These new CSI reporting SB sequences may be captured in different CSI-ReportConfig.

Afterwards, the new CSI-ReportConfig may be associated with new states in CSI-AperiodicTriggerStateList.

In Example 3-1.1.1, without adding additional bits to CSI request field of size NTs-bits in the DCI format 0_1 for A-CSI triggering, new state selection may be handled. In that case, if configured states are greater than $2^{N_{TS}}-1$, the UE 10 is separately configured with a selection command to map $2^{N_{TS}}-1$ code points to trigger states.

In Example 3-1.1.2, additional x-bit(s) may be added to CSI request field size NTs-bits in the DCI format 0_1 for A-CSI triggering, in order to select newly added states to the CSI-AperiodicTriggerStateList.

Example 3-1, Example 3-1.1, Example 3-1.1.1, Example 3-1.1.2, are discussed for delay pre-compensated channel. However, those examples for CSI reporting SB configurations are valid even without applying delay pre-compensation. For example, by analyzing channel conditions considering SRS in the UL (no delay pre-compensation), the NW (BS) 20 can configure appropriate CSI reporting SBs considering previous proposals In Example 3-2, by analyzing channel conditions considering SRS transmission, the NW (BS) 20 can configure CSI reporting SBs for l-th layer/common for all layers more flexibly and dynamically using previously discussed, Example 3-1. Example 3-1.1, Example 3-1.1.1, and Example 3-1.1.2

(Configuration of BS)

Figure 16:
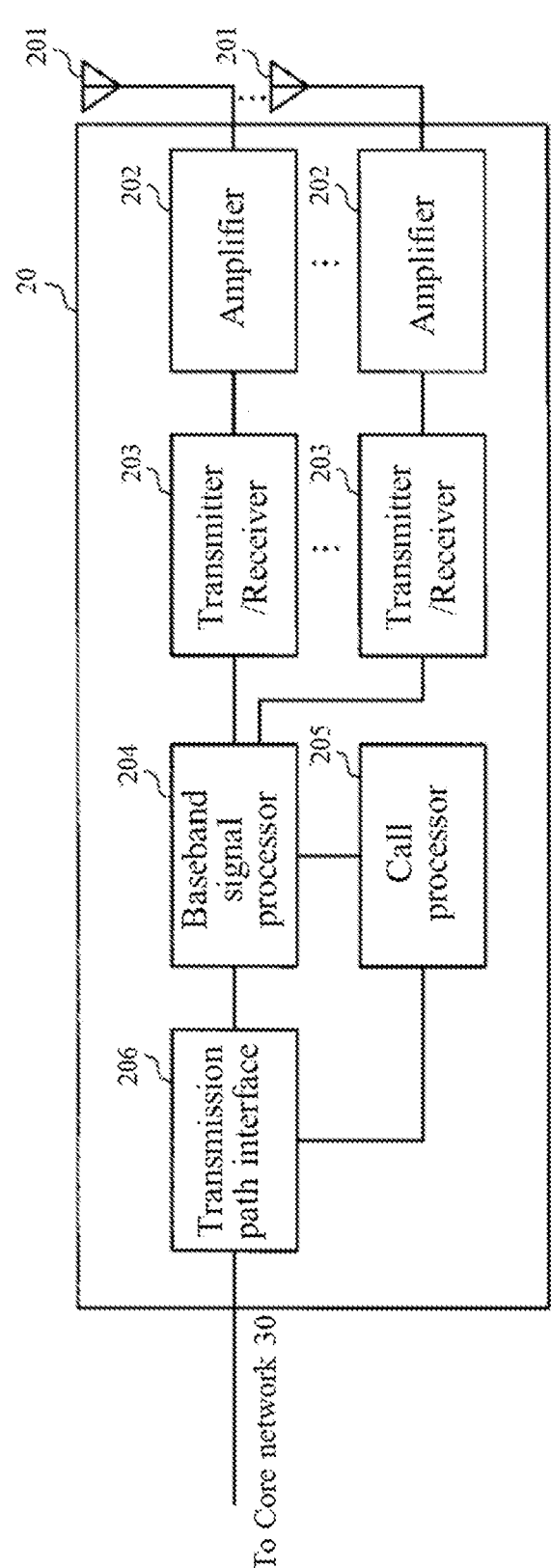
FIG. 16 is a diagram showing a schematic configuration of a BS according to embodiments.

The BS 20 according to embodiments of the present invention will be described below with reference to FIG. 16. FIG. 16 is a diagram illustrating a schematic configuration of the BS 20 according to embodiments of the present invention. The BS 20 may include a plurality of antennas (antenna element group) 201, amplifier 202, transceiver (transmitter/receiver) 203, a baseband signal processor 204, a call processor 205 and a transmission path interface 206.

User data that is transmitted on the DL from the BS 20 to the UE 20 is input from the core network, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., Radio Resource Control (RRC) signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network through the transmission path interface 206. The call processor 205 performs call processing such as setting up and releasing a communication channel, manages the state of the BS 20, and manages the radio resources.

(Configuration of UE)

Figure 17:
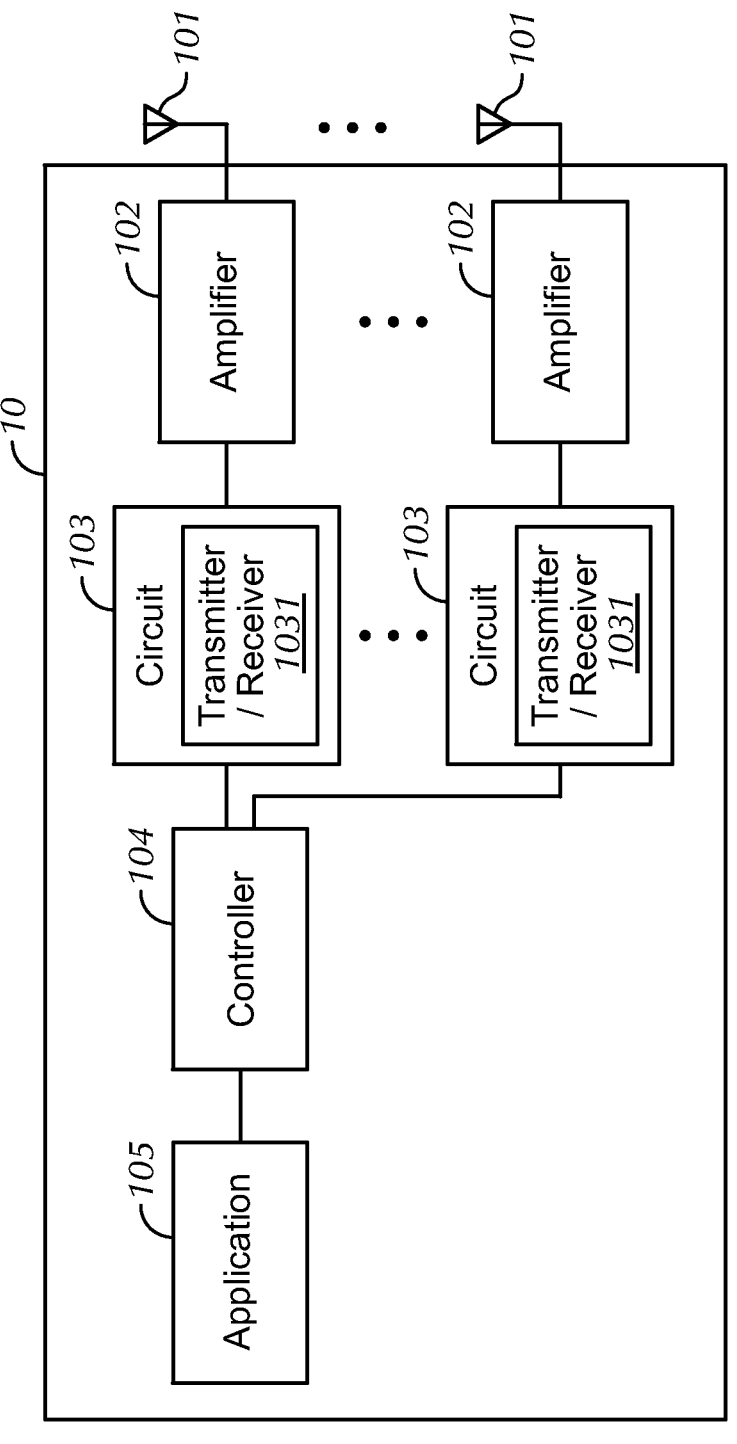
FIG. 17 is a diagram showing a schematic configuration of a UE according to embodiments.

The UE 10 according to embodiments of the present invention will be described below with reference to FIG. 17. FIG. 17 is a schematic configuration of the UE 10 according to embodiments of the present invention. The UE 10 has a plurality of UE antenna S101, amplifiers 102, the circuit 103 comprising transceiver (transmitter/receiver) 1031, the controller 104, and an application 105.

As for DL, radio frequency signals received in the UE antenna S101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

(Another Example)

The above examples and modified examples may be combined with each other, and various features of these examples may be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A wireless communication method for a user equipment (UE) in communication with a base station (BS) comprising:

receiving from the BS, via higher-layer signaling or downlink control information (DCI), configuration information; and configuring a layer-specific or layer-common dynamic subband (SB) size configuration using the configuration information, wherein new states are included in radio resource control (RRC) information element (IE) CSI-AperiodicTriggerStateList with different SB sizes, and wherein an appropriate state is selected based on channel conditions.

2. The wireless communication method according to claim 1, wherein an explicit configuration of a SB size is configured based on channel condition with or without delay pre-compensation.

3. The wireless communication method according to claim 1, further comprising:

selecting one out of multiple SB sizes which are configured by higher-layer signaling.

4. The wireless communication method according to claim 1, further comprising:

selecting one out of multiple SB sizes defined for a predetermined bandwidth part.

5. The wireless communication method according to claim 1 further comprising:

performing dynamic selection of one out of multiple channel state information (CSI) reporting SB configurations for a predetermined number of SBs.

6. The wireless communication method according to claim 5, wherein new states are included in RRC IE CSI-AperiodicTriggerStateList with different CSI reporting SB configurations for a predetermined number of SBs.

\* \* \* \* \*